United States Patent [19]

Macedo et al.

[11] 4,188,198
[45] Feb. 12, 1980

[54] JOINT DOPING OF POROUS GLASSES TO PRODUCE MATERIALS WITH HIGH MODIFIER CONCENTRATIONS

[75] Inventors: Pedro B. Macedo, 6100 Highboro Dr., Bethesda, Md. 20034; Joseph H. Simmons, Bethesda, Md.; Mrinmay Samanta, Washington, D.C.

[73] Assignees: Pedro Buarque de Macedo, Bethesdam; Theodore Aaron Litovits, Silver Spring, both of Md.

[21] Appl. No.: 853,411

[22] Filed: Nov. 23, 1977

Related U.S. Application Data

[63] Continuation-in-part of Ser. No. 755,590, Dec. 30, 1977.

[51] Int. Cl.$^2$ .................. C03C 25/02; C03C 15/00
[52] U.S. Cl. ........................... 65/3 A; 65/31; 106/52; 106/53; 106/50; 350/96.33
[58] Field of Search ............... 65/DIG. 7, 31, 30 R, 65/17, 3 A; 106/52, 50, 53; 350/96.33

[56] References Cited

U.S. PATENT DOCUMENTS

| | | | |
|---|---|---|---|
| 3,627,550 | 12/1971 | Monneraye | 65/32 X |
| 3,859,103 | 1/1975 | Yoshiyagawa et al. | 65/30 E |
| 3,938,974 | 2/1976 | Macedo et al. | 65/30 R |
| 4,061,486 | 12/1977 | Jahn | 65/31 |
| 4,073,579 | 2/1978 | Deeg et al. | 65/31 |
| 4,110,093 | 8/1978 | Macedo et al. | 65/3 R |
| 4,110,096 | 8/1978 | Macedo et al. | 65/30 R |

*Primary Examiner*—S. Leon Bashore
*Assistant Examiner*—Frank W. Miga
*Attorney, Agent, or Firm*—Fleit & Jacobson

[57] ABSTRACT

A glass article is produced by doping a porous glass matrix with at least one member selected from the group consisting of PbO and $Bi_2O_3$ and at least one member selected from the group consisting of $K_2O$, $Rb_2O$ and $Cs_2O$, and producing a profile in dopant composition by immersion in a multiple-solvent solution.

5 Claims, No Drawings

JOINT DOPING OF POROUS GLASSES TO PRODUCE MATERIALS WITH HIGH MODIFIER CONCENTRATIONS

The invention herein described was made in the course of or under a contract or subcontract thereunder (or grant) with the Department of Defense.

CROSS-REFERENCE TO RELATED APPLICATION

This application is a continuation-in-part of Ser. No. 755,590, filed Dec. 30, 1977.

The use of porous glasses as substrates for the molecular deposition of selected materials has shown great promise in the production of materials with selected physico-chemical properties and selected property variations. This process, called "Molecular Stuffing" or doping has been described in detail in U.S. Pat. No. 3,938,974 and U.S. Pat. Nos. 4,110,093 and 4,110,096. In addition to such porous glasses, the present invention is applicable to porous glass produced by such other methods as chemical vapor deposition. (See U.S. Pat. No. 3,859,093).

By the molecular stuffing process, selected solutions containing materials which alter the physico-chemical properties of high silica glasses are diffused into the pores of a high silica base glass preform to achieve a homogeneous concentration of the modifiying agent or agents (solute). For step concentration profiles these modifiers are subsequently precipitated and a cladding region is formed by their removal from the outer regions of the preform by a suitable solvent before drying and sintering of the preform assembly. For graded concentration profiles, the concentration of selected modifiers is altered to a desired variation by a second soaking of the preform is selected solvent solutions containing selected concentrations of modifiers. This is followed by precipitation of the modifiers and subsequent drying and sintering of the preform assembly. (See U.S. Pat. No. 4,110,093).

The change in physical property achieved by the addition of dopants is a function of the dopant concentration. Therefore the addition of high dopant concentrations generally induces a large change.

Several products benefit from large variations in physical properties and therefore large variations in dopant concentration. For example, in fiber optics, a large change in index of refraction between the core and cladding regions of a fiber yields a high numerical aperture, while in strengthening brittle materials, a large change in thermal expansion coefficient and/or in glass transition temperature between the surface and the interior of an article allows the formation of large surface compressions (prestressing) and thus the achievement of correspondingly increased strenthening.

The numerical aperture, NA, of a light transmitting device is a measure of its acceptance angle. In optical waveguides the numerical aperture is related to the difference in refractive index, n, between the axis or center of the waveguides and the off axis elements. An increase in numerical aperture is obtained by increases in the index difference between these elements (for example, in waveguides with step index profiles, the difference is between the refractive index of the core, $n_1$, and the clad, $n_2$, regions; thus $NA - \sqrt{n_1^2 - n_2^2}$).

Since numerical aperture is related to the angle of acceptance of the incident light beam, high numerical apertures are desirable since this allows transmission of relatively more energy from a given light source. High numerical apertures are also desirable from the standpoint of reducing microbending losses in optical waveguide fibers, and for the preparation of lens elements and other optical elements.

The process described in U.S. Pat. Nos. 3,938,974 and 4,110,093, the disclosures of which are incorporated herein by reference, demonstrates how molecular stuffing of porous glasses may be conducted using a series of dopants both individually and in groups to develop integrated optics components with tailored refractive index distributions and strengthened articles with tailored thermal expansion coefficient and glass transition temperature distributions.

This invention employs glass compositions and dopants similar to those in U.S. Pat. Nos. 4,110,093 and 4,110,096. However, we have found that certain dopants, such as lead, induce noticeable scattering in the glass when large dopant concentrations are used. Though scattering has little effect on most uses such as integrated optics components and strengthened members, some uses such as the transmission of very high quality images (e.g. in cystoscopes) or long, extremely low loss, (e.g. below 20 dB/km) optical fibers with a high numerical aperture (e.g. N.A. greater than 0.35) may be limited by the amount of light scattering present. For example, when lead is used as a dopant oxide at doping concentrations above 40 grs. $Pb(NO_3)_2/100$ cm$^3$ of water, scattering is observed in the final glass. This is an important limitation because lead has a high atomic polarizability and is useful to obtain high index glasses. It would be of considerable advantage if glasses could be made with large concentrations of Pb as a dopant in those situations where a combination of high NA and very low scattering loss were desired.

We have discovered that when the dopant in molecular stuffing is composed of certain combinations of lead and/or bismuth with cesium, rubidium, and/or potassium, then a remarkable and unexpected decrease in the scattering loss occurs. Further, we have discovered that certain of these combinations which give low scattering losses may be used to obtain high numerical apertures and/or high pre-stressing levels as well.

The desired combination of dopants leads to glass articles with the following final composition. The composition of these glasses consists of at least 85 mole percent $SiO_2$ with improvements which comprise at least 7 wt. percent of at least one member selected from Group (I) consisting of PbO and $Bi_2O_3$ and at least 1.5 mole percent of at least one member selected from Group (II) consisting of $K_2O$, $Rb_2O$, and $Cs_2O$.

Even though the maximum dopant concentration is limited by the concentration of $SiO_2$, the broad limits are a maximum of 25 wt. percent for Group (I) and a maximum of 9 mole percent for Group (II). Our preferred range covers at least 2 but not more than 9.5 mole percent $B_2O_3$ and at least 7 but not more than 20 wt. percent of Group (I) and at least 1.5 but not more than 7 mole percent of Group (II).

In another embodiment of this invention, we have discovered that a method which comprises adding a dopant to a porous matrix with interconnective pores, immersing the porous matrix in a solution of a dopant causing the dopant to precipitate in the matrix, removing solvent and where necessary, decomposition products, from the porous matrix and collapsing the porous matrix to a solid form, can be used to produce high silica glasses. These glasses can be produced with the following mixed dopant compositions: Group I being Pb and/or Bi and Group II being K, Rb, and/or Cs in the form of nitrates, carbonates, acetates, borates, phosphates, arsenates and/or silicates in either hydrated or unhydrated form of mixtures therefrom used to produce a glass having a composition of 7 to 25 wt percent (preferred range 7 to 20 wt. percent) of the oxide equivalent of at least one member selected from Group I consisting of Pb and Bi and 1.5 to 9 mole percent (the preferred range being 1.5 to 7 mole percent) of the oxide equivalent of at least one member selected from Group II consisting of K, Rb, and Cs.

In another embodiment of this invention, letting I represent [Pb(NO$_3$)$_2$] and [Bi(NO$_3$)$_2$], and II represent the alkali nitrates of Cs, Rb and K, taken either singly or in combination, the ranges of dopant which yield glasses with high numerical aperture and low scattering loss are:

|  | Broad g/100 cm$^3$ solution | Preferred g/100 cm$^3$ solution |
|---|---|---|
| Group I | 45–200 | 50–150 |
| Group II | 40–200 | 50–150 | where the weight represents the weight of at least one member of the group in the form of a nitrate salt. The stuffing solutions may be water, optionally with small amounts of low molecular weight alcohols such as methanol. The solvents used in precipitating the dopants may be low molecular weight alcohols such as methanol and ethanol.

In another embodiment of this invention when multiple dopants are used and precise control in the variation of dopant concentration near the surface of the article, e.g., to produce a composition step profile, is desired, we have found that after the dopant has filled the pores of the article, it is necessary to immerse the articles in a solution of multiple solvents which are selected so that the solubility of each dopant compound is equal to within ±50 percent. Thus there will be approximately the same change in concentration of each dopant in the region of the article near the surface, preferably the dopant solubilities are ½ to 15 grs of dopant material per 100 cc of solvent solution. It is preferred to further wash the glass article in a solution selected to control the solubility of each dopant compound within a range of 0 to 2 grs of dopant material per 100 cc of solution.

EXAMPLES

Porous glasses are used as substrates for the deposition of the selected dopant combinations. Any porous glass preform is satisfactory. In these examples we prefer to describe a specific method for forming the porous glass substrate by phase separation, although other processes are just as useful. (See for example Schultz, U.S. Pat. No. 3,859,073.)

An alkali borosilicate glass of composition 57% SiO$_2$, 36% B$_2$O$_3$, 4% Na$_2$O and 3% K$_2$O is melted in a Pt crucible in an electric furnace at temperatures between 1300° and 1450° C. The melt is homogenized by stirring with a Pt stirrer, and is then pulled in the form of rods 5/16" diameter by 4' length. These rods are then cut into rods 4" in length which are heat-treated at 550° C. for 1½ hours to induce phase separation and subsequently leached in a 3 N HCl acid solution. During the phase separation heat-treatment, the homogeneous glass decomposes into two phases, one with high silica content and one with high boron and alkali content and lower silica content. These phases are interconnected sufficiently that exposure to the leaching solution completely removes the alkali rich phase leaving behind a high silica porous glass substrate. The porous glass is washed with deionized water.

The porous glass substrate is immersed in a solution containing the desired concentrations of dopants (see Table 1) for 3 hours or longer to allow the solution to fill the pores completely. The dopant compounds are then precipitated from solution.

In following this process we have found it desirable to achieve precipitation of the dopants by thermal means; that is, lowering the temperature of preform and solvent to a point where the solution within the pores becomes supersaturated with the dopant causing the dopant to precipitate in the pores. The sample is then transferred to an unstuffing solution of solvent whereby some of the dopant is allowed to diffuse out of the pores yielding a sample with graded dopant concentration. This step is necessary in both fiber optics to achieve high numerical apertures and in strengthening to achieve high surface compressive stresses. When graded properly, the dopant concentration is nil near the surface of the object thus yielding a low refractive index and/or a low thermal expansion coefficient in the cladding region. The unstuffing step is often conducted sequentially in two different solutions to insure maximum dopant removal from regions near the surface of the object (see Table 1) steps (a) and (b). The sample is kept at 0° C. where it is exposed to vacuum for 24 hours and then heated at 15° C./hour up to 625° C. under vacuum and sintered between 830° and 850° C.

EXAMPLES I, II AND III

Table I reports details (concentration of solution, temperature and times) of the preparation and measurements of refractive index in the core (central) and cladding (outer) regions of the objects made by using lead nitrate and cesium nitrate as dopants. Corresponding numerical apertures are also listed. Table II lists the compositions at the center of the final glass articles. A fiber was pulled from Sample II and scattering losses were found to be less than 20 dB/km in each case.

EXAMPLES IV TO VIII

A porous glass preform prepared as described in Examples I to III is soaked in a dopant solution as described in Table III at a temperature specified in Table III for 16 hours. This temperature is chosen to be at or above the solubility temperature of the designated dopant concentrations. This allows the dopant solution to fill the pores of the preform completely and uniformly. The preform is then removed from the dopant solution and is soaked in a single solvent as specified in Table III for three hours in order to precipitate the dopant within the pores. No dopant removal was attempted since these glasses were made only to observe index change with concentration. The sample is then kept at 0° C. where it is exposed to vacuum for 24 hours and warmed up at 15° C. per hour up to 625° C. also under vacuum. It is then heated to between 830° and 850° C. where sintering occurs. Refractive index measurements conducted on these samples are reported in Table III. Table IV details the compositions of the final glass articles listed for Examples VI and VII.

TABLE I

| Dopant Solution | Dopant Stuffing Temperature | DOPANT UNSTUFFING* | | | Refractive Index Core | Refractive Index Clad | Numerical Aperture |
|---|---|---|---|---|---|---|---|
| | | Time | Temp. | Solvent | | | |
| Example I | | | | | | | |
| 150 g $Pb(NO_3)_2$ | | (a) 2 hrs. | 0° C. | 50/50 methanol-water solution | 1.527 | 1.459 | 0.45 |
| + 150 g $Cs(NO_3)$ | 137° C. | (b) 1 hr. | 0° C. | | | | |
| per 100 ml of aqueous solution | | | | 100% methanol | | | |
| Example II | | | | | | | |
| 100 g $Pb(NO_3)_2$ | 107° C. | (a) 2 hrs. | 0° C. | 50/50 methanol-water solution | 1.512 | 1.458 | 0.40 |
| + 100 g $Cs(NO_3)$ | | (b) 1 hr. | 0° C. | | | | |
| per 100 ml of aqueous solution | | | | 100% methanol | | | |
| Example III | | | | | | | |
| 80 g $Pb(NO_3)_2$ | 100° C. | (a) 2 hrs. | 0° C. | 50/50 methanol-water solution | 1.499 | 1.4558 | 0.36 |
| + 200 g $Cs(NO_3)$ | | (b) 1 hr. | 0° C. | | | | |
| per 100 ml of aqueous solution | | | | 100% methanol | | | |

*Unstuffing is done in two steps: solution (a) followed by solution (b).

TABLE II

| Example | $SiO_2$ mol | $SiO_2$ wt | $B_2O_3$ mol | $B_2O_3$ wt | $Cs_2O$ mol | $Cs_2O$ wt | PbO mol | PbO wt |
|---|---|---|---|---|---|---|---|---|
| I | 86 | 64 | 3 | 3 | 5 | 17 | 6 | 16 |
| II | 90 | 72 | 3 | 3 | 3 | 11 | 4 | 14 |
| III | 87 | 67 | 3 | 3 | 6 | 21 | 3 | 9 |

TABLE III

| Example | Dopant solution (per 100 ml of aqueous solution) | Dopant solution temperature | Solvent temp. | Refractive index in core |
|---|---|---|---|---|
| IV | 50 g $KNO_3$ + 95 g $Pb(NO_3)_2$ + 63 g $RbNO_3$ + | 120° C. | ethanol 0° C. | 1.506 |
| V | 100 g $Pb(NO_3)_2$ + 120 g $CsNO_3$ + | 120° C. | ethanol 0° C. | 1.514 |
| VI | 100 g $Bi(NO_3)_3$ + $5H_2O$ + 136 g $CsNO_3$ + | 110° C. | ethanol 0° C. | 1.514 |
| VII | 57.1 g $Pb(NO_3)_2$ + 57.1 g $Bi(NO_3)_3$ $5H_2O$ | 110° C. | ethanol 0° C. | 1.516 |

TABLE IV

| Example | $SiO_2$ mol | $SiO_2$ wt | $B_2O_3$ mol | $B_2O_3$ wt | $Cs_2O$ mol | $Cs_2O$ wt | PbO mol | PbO wt | $Bi_2O_3$ mol | $Bi_2O_3$ wt |
|---|---|---|---|---|---|---|---|---|---|---|
| VI | 91 | 73 | 3 | 3 | 4 | 15 | 0 | 0 | 2 | 9 |
| VII | 89 | 69 | 3 | 3 | 4.5 | 16 | 2.5 | 7 | 1 | 5 |

In cases where multiple dopants are used and precise control of the profile variation in the cross-section of the article is desired, we have found that the following unstuffing process yields good results.

The porous glass perform is prepared as discussed above and a combination of dopants are diffused in its pores. Let us denote these by dopant A and dopant B. Precipitation is achieved by either cooling the glass article or immersing it into a solvent with extremely low solubility for both dopants A and B.

In the ensuing unstuffing process, where good control of the dopant concentration is necessary, we have found it desirable to use mixed solvents. It is useful to have the dopants A and B both with the same solubility in the solvent mixture. This is accomplished by selecting a minimum of 2 solvents with the following properties.

The first set of solvents or single solvent has the desired unstuffing solubility which in the case of step profiles is 0.5 to 15 grs/100 cc of solution for dopant A. The second solvent or set of solvents has the desired unstuffing solubility of 0.5 to 15 grs/100 cc of solution for dopant B at the same temperature. The solvents are chosen so that when mixed together, the two sets of solvents have the desired unstuffing solubility of 0.5 to 15 grs/100 cc of solution for both dopants A and B. Best control of profile is afforded when the solubilities for dopants A and B are equal to within ±50%; that is, if the solubility of dopant A in solution is 5 grs/100 cc of solution, then the solubility of B is between 2.5 grs/100 cc and 7.5 grs/100 cc of solution.

In the stuffing step, dopant concentration is in the order of 100 gm per 100 cc of solution. In contrast the first unstuffing solution solubilites given above are in the order of a factor of 10 less than during the stuffing step.

Preferably the glass article is further washed in a wash solution in which the dopants are even less soluble, e.g., a solubility of 0 to 2 grs of dopant per 100 cc of solution. This wash step ensures that substantially complete precipitation of dopant has occurred before drying is commenced.

Solvents can be selected from the following group:
1. Water, in which the alkali metals are very soluble. In water, potassium, rubidium and cesium nitrates have a high temperature dependence of solubility which is useful in thermal precipitation.

2. Lower molecular weight aliphatic alcohols (i.e., less than 6 carbons/molecule) in which the alkali metal and lead salts are progressively less soluble with increasing molecular weight. Alcohols with six or more carbons per molecule have such low solubilities for the dopants used here that they are not commonly used.

3. Acids: the solubility of bismuth is strongly dependent on the pH of the solution. This solubility can be controlled by introducing an acid. The acid and any resultant salts formed by reaction of the acid with the dopants of group I and II must either evaporate or decompose into on oxide compound before sintering occurs. We prefer to use nitric acid.

Ternary dopant systems are handled in the same way with several solvents in solution with each other.

In both these cases of multidopant stuffing and controlled profiling, it is possible to develop high residual stresses in rods by selecting dopants which alter the thermal expansion coefficient or the glass transition temperature or both properties of the porous glass.

The two examples below describe processes used for two and three joint dopants with controlled profiles to develop a residual compressive stress in the outside layer of the consolidated glass articles.

EXAMPLE IX

In this example we describe a procedure for 2 dopants which are jointly diffused into the pores of a porous preform. Profiling of these dopants is accomplished by using a solvent consisting of a solution of 3 solvents.

Porous glass articles in the shape of cylindrical rods were prepared as in Example 1 above. The porous preforms were immersed in a stuffing solution containing 120 grs of $CsNO_3$ and 100 grs of $Bi(NO_3)_3 \cdot 5H_2O$ per 100 cc of solution, at 108° C. for a period of 24 hours. The dopants within the pores were then precipitated by transferring to an unstuffing solution consisting of three solvents at 0° C. in the following proportion: 6.4% methanol, 10.8% of 70% nitric acid in water solution and 82.8% water by volume. The rods remained in this solution for 5 hours at 0° C. A clear region appeared within the outside surface. The samples were washed for 48 hours in a solution of 82.2% methanol, 1.8% of 70% nitric acid in water solution and 16% water at 0° C., and then were dried at 0° C. for 7 hours. The samples were then heated in vacuum to decompose the nitrates and sinter the pores, reaching a temperature of 825° C.

The consolidated samples were examined and consisted of a cladding region relatively free of dopant compounds adjacent to the outside surface of the sample, and a core region within the cladding which contained substantially all the dopants. Measurements with an optical microscope revealed a ratio of cladding thickness to rod radius of 0.342 and a compressive stress in the cladding region of 14,000 psi. Measurements of light scattering loss from these samples showed an intrinsic scattering loss of 3.4 dB/km at 1.05 μm.

EXAMPLE X

In this example we describe a procedure for 3 dopants which are jointly diffused into the pores of a porous preform Profiling is accomplished by using a solvent consisting of a solution of 3 solvents.

Porous glass preforms were prepared as in Example 1 above. The porous preforms were immersed in a stuffing solution made by saturating 50 ml of water with $CsNO_3$, then saturating the solution with $KNO_3$ and dissolving $Bi(NO_3)_3 \cdot 5H_2O$ in the solution at a temperature of 100° C. The final composition of the stuffing solution consisted of 50 ml $H_2O$, 94 grs $CsNO_3$, 142 grs $KNO_3$ and 234 grs $Bi(NO_3)_3 \cdot 5H_2O$. The rods were left immersed in this solution for 48 hours at 100° C. The dopants within the rods were then precipitated by transferring the rods from the hot stuffing solution to methanol at 0° C. The rods were kept in methanol for 10 minutes and then were transferred to an unstuffing solution consisting of three solvents at 0° C. in the following proportion: 6.5% methanol, 10.8% of 70% nitric acid and 82.7% water by volume. The rods remained in this solution for 1.5 hours at 0° C. A clear region appeared over the external surface of the samples. The samples were then washed in methanol at 0° C. for 24 hours and were dried in vacuum at 4° C. for 24 hours. The rods were then heated in vacuum to decompose the nitrates and sinter the pores at 850° C.

The consolidated rods were examined and consisted of a cladding region relatively free of dopant compounds adjacent to the outside surface of the sample and a core region within the cladding which contained substantially all the dopants. Measurements with a microscope revealed a ratio of cladding thickness to rod radius of 0.16 and a compressive stress in the cladding region of 25,000 psi. Measurements of light scattering loss from these samples showed an intrinsic scattering loss of 1.6 dB/km at 1.05 μm.

We claim:

1. In a method of producing a glass article comprising adding a dopant to a porous glass matrix with interconnected pores by immersing the porous glass matrix in a solution of the dopant to impregnate the porous glass matrix with the solution, precipitating the dopant from the solution within the porous glass matrix, removing solvent and when necessary decomposition products from the porous glass matrix and collapsing the porous glass matrix to a solid form, the improvement which comprises immersing the porous glass matrix in a first dopant impregnating solution containing a mixture of dopants to impregnate the porous glass matrix with the first solution and form an impregnated porous glass matrix with the following composition:

(1) 7 to 25 weight % of the oxide equivalent of at least one member selected from the dopant group consisting of Pb and Bi, and (2) 1.5 to 9 mole % of the oxide equivalent of at least one member selected from the dopant group consisting of Cs, Rb, and K, and, prior to removing solvent and when necessary decomposition products from the porous glass matrix, immersing the impregnated porous glass matrix in a second dopant removing solution containing a separate solvent for each dopant group selected so that the solubilities of the dopants in the second solution are less than in the first solution and are approximately equal to within ±50% to decrease the concentration of each dopant substantially the same amount in the region of the article near the surface.

2. The method according to claim 1 wherein the solubilities of each of the dopants in said second solution is 0.5 to 15 grams per 100 cc of solution.

3. The method according to claim 1 wherein said second solution is an acidified aqueous solution containing a lower aliphatic alcohol.

4. The method according to claim 1 and further comprising precipitating the dopants within said impregnated porous glass matrix during immersion in said second solution.

5. The method according to claim 1 and further comprising precipitating the dopants prior to immersing said impregnated porous glass matrix in said second solution.

* * * * *

UNITED STATES PATENT AND TRADEMARK OFFICE
CERTIFICATE OF CORRECTION

PATENT NO. : 4,188,198
DATED : February 12, 1980
INVENTOR(S) : Pedro B. MACEDO et al It is certified that error appears in the above—identified patent and that said Letters Patent is hereby corrected as shown below:

In Section [73], after "Assignees", second line, change "Bethesdam" to read --Bethesda-- and change "Litovits" to read --Litovitz--

In Section [63], change "Dec. 30, 1977" to read --Dec. 30, 1976--

Signed and Sealed this

Fourth Day of November 1980

[SEAL]

Attest:

SIDNEY A. DIAMOND

Attesting Officer

Commissioner of Patents and Trademarks